United States Patent
Hansen et al.

(10) Patent No.: US 9,046,698 B2
(45) Date of Patent: Jun. 2, 2015

(54) MULTI-AXIS LENS DESIGN FOR ASTIGMATISM

(75) Inventors: Jonathan Hansen, Jacksonville, FL (US); James Michalski, Saint Johns, FL (US); C. Benjamin Wooley, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 13/407,229

(22) Filed: Feb. 28, 2012

(65) Prior Publication Data

US 2013/0222761 A1   Aug. 29, 2013

(51) Int. Cl.
G02C 7/00   (2006.01)
G02C 7/04   (2006.01)

(52) U.S. Cl.
CPC ......... *G02C 7/04* (2013.01); *G02C 7/045* (2013.01); *G02C 7/048* (2013.01)

(58) Field of Classification Search
CPC ... G02C 7/041; G02C 7/049; B29D 11/00038
USPC .............. 351/159.02, 159.05, 159.07, 159.1, 351/159.12, 159.13, 159.14, 159.16, 351/159.21, 159.37, 159.38, 159.41, 351/159.43, 159.46, 159.53, 159.54, 351/159.72, 159.73–159.79, 159.8, 159.81, 351/159.19, 159.22, 159.36, 178
See application file for complete search history.

(56) References Cited

U.S. PATENT DOCUMENTS

| 5,652,638 | A |   | 7/1997 | Roffman et al. |
|---|---|---|---|---|
| 5,796,462 | A | * | 8/1998 | Roffman et al. ............. 623/6.24 |
| 6,142,625 | A | * | 11/2000 | Sawano et al. ........... 351/159.07 |
| 7,503,652 | B2 | * | 3/2009 | Menezes ................... 351/159.05 |
| 7,699,464 | B2 |   | 4/2010 | Iuliano |
| 2004/0017542 | A1 | * | 1/2004 | Lindacher et al. ........ 351/160 R |
| 2004/0233382 | A1 | * | 11/2004 | Lindacher et al. ........ 351/160 R |
| 2006/0290882 | A1 |   | 12/2006 | Meyers et al. |
| 2009/0213326 | A1 | * | 8/2009 | Zhao ............................. 351/176 |
| 2010/0245759 | A1 | * | 9/2010 | Legerton et al. .......... 351/160 R |

FOREIGN PATENT DOCUMENTS

EP   0745876 B1   12/1996
WO   WO 2009/105567 A1   8/2009

OTHER PUBLICATIONS

European Search Report for corresponding Application No. EP13156971 dated May 7, 2013.
Search Report issued for the corresponding Russian Application No. 2013110803/28.
Veys, J., et al., Soft Toric Contact Lens Fitting: The Vision Care Institute of Johnson & Johnson Medical Ltd., 2008.
Search Report issued by the Intellectual Property Office of Singapore dated Jul. 23, 2014 for Application No. 201301363-6.
Australian Search Report dated Apr. 10, 2014 for corresponding Application No. 2013200831.
Singapore Search Report dated Jul. 31, 2014 for corresponding Application No. 201301363-6.

* cited by examiner

*Primary Examiner* — Ricky Mack
*Assistant Examiner* — Gary O'Neill
(74) *Attorney, Agent, or Firm* — Carl J. Evens

(57) ABSTRACT

A toric contact lens utilizes concentric annual rings, a continually varying lens design as a function of distance from the lens center or any other function to create a range of cylinder axis zones on a single lens.

2 Claims, 4 Drawing Sheets

MULTI-AXIS LENS DESIGN FOR ASTIGMATISM

BACKGROUND OF THE INVENTION

1. Field of the Invention

The present invention relates to toric contact lenses, and more particularly to toric contact lenses incorporating a multifocus axis component into the design thereof to reduce the sensitivity of astigmatic patients to toric axis misalignment.

2. Discussion of the Related Art

Myopia or nearsightedness is an optical or refractive defect of the eye wherein rays of light from an image focus to a point before they reach the retina. Myopia generally occurs because the eyeball or globe is too long or the shape or contour of the cornea is too steep. A minus powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the shape or contour of the cornea is too flat. A plus powered spherical lens may be utilized to correct hyperopia. Astigmatism is an optical or refractive defect in which an individual's vision is blurred due to the inability of the eye to focus a point object into a focused image on the retina. Unlike myopia and/or hyperopia, astigmatism is unrelated to globe size or corneal steepness, but rather it is caused by an abnormal, non-rotationally symmetric or non-spherical curvature of the cornea. A perfect cornea is spherical whereas in an individual with astigmatism, the cornea is not spherical. In other words, the cornea is actually more curved or steeper in one direction than another, thereby causing an image to be stretched out rather than focused to a point. A cylindrical lens rather than a spherical lens may be utilized to resolve astigmatism.

A toric lens is an optical element having two different powers in two orientations that are perpendicular to one another. Essentially, a toric lens has one power, spherical, for correcting myopia or hyperopia and one power, cylinder, for correcting astigmatism built into a single lens. These powers are created with curvatures at different angles which are preferably maintained relative to the eye. Toric lenses may be utilized in eyeglasses, intraocular lenses and contact lenses. The toric lenses used in eyeglasses and intraocular lenses are held fixed relative to the eye thereby always providing optimal vision correction. However, toric contact lenses may tend to rotate on the eye thereby temporarily providing sub-optimal vision correction. Accordingly, currently utilized toric contact lenses also include a mechanism to keep the contact lens relatively stable on the eye when the wearer blinks or looks around.

When a toric contact lens is first placed in the eye, it must automatically position or auto-position itself and it then maintains that position over time. However, once the toric contact lens is positioned, it tends to rotate on the eye due to the force exerted on the contact lens by the eyelids during blinking as well as eyelid and tear film movement. Maintenance of the on-eye orientation of a toric contact lens is generally accomplished by altering the mechanical characteristics of the toric contact lens. For example, prism stabilization, including decentering of the contact lens' front surface relative to the back surface, thickening of the inferior contact lens periphery, forming depressions or elevations on the contact lens' surface, and truncating the contact lens edge are all methods that have been utilized.

Each of more traditional stabilization techniques have advantages and disadvantages associated therewith. The main disadvantage of these types of designs is that they rely on the interaction of the eyelids and the contact lens' thickness differential to orient the contact lens to the correct location on the wearer's eye. The problem is particularly acute with so-called plus powered toric contact lenses.

An additional disadvantage associated with currently utilized toric contact lenses is the relatively large number of cylindrical axis placements required to fit astigmatic patients. In other words, in order to accommodate astigmatic patients utilizing toric contact lenses, a large number of stock keeping units (SKUs) are required.

Accordingly, it would be advantageous to design a toric contact lens with reduced reliance on rotational stabilization requirements as well as adding additional cylindrical powers to provide enhanced visual acuity.

SUMMARY OF THE INVENTION

The multi-axis toric lens design of the present invention overcomes a number of disadvantages associated with orientating and maintaining the orientation of toric contact lenses on a wearer's eye.

In accordance with one aspect, the present invention is directed to an ophthalmic device. The ophthalmic device comprising a contact lens requiring rotational stability on eye, the contact lens having a front curve surface, a back curve surface, an optical zone and a peripheral stabilization zone, and one or more sub-zones incorporated into at least one of the front curve surface or the back curve surface of the contact lens in the optical zone, the one or more sub-zones having a different cylindrical axis from one another.

In accordance with another aspect, the present invention is directed to a method for making an ophthalmic device. The method comprising forming a contact lens requiring rotational stability on eye and having a front curve surface, a back curve surface, an optical zone and a peripheral stabilization zone, and incorporating one or more sub-zones into at least one of the front curve surface or the back curve surface of the contact lens in the optical zone, wherein the one or more sub-zones have a different cylindrical axis from one another.

The present invention is directed to a toric contact lens with a multifocus axis component designed into the contact lens in addition to any suitable mechanical stabilization features built into the contact lens. In other words, in order to compensate for temporary off axis positioning and/or to minimize reliance solely on maintaining rotational stability, a toric contact lens may be designed with varying lens design parameters in the optic zone. Accordingly, the toric contact lens of the present invention provides astigmatic patients with a contact lens that reduces the sensitivity of the patient to toric axis misalignment, which in turn reduces the rotational stabilization requirements for a given toric contact lens design.

In one exemplary embodiment, the toric contact lens design of the present invention utilizes concentric annular rings which represents a discrete design approach. In another exemplary embodiment, the toric contact lens design of the present invention utilizes a continually or continuously varying lens design parameter as a function of distance from the lens center which represents a continuous design approach. It is important to note, however, that any type of design means or function to create a range of the cylinder axis zones may be utilized in accordance with the present invention. With this range of cylinder axis zones, the toric contact lenses of the present invention may also reduce the number of cylinder axis placements or stock keeping units (SKUs) required to fit astigmatic patients relative to conventional toric contact lens designs. In other words, the number of SKUs required may be lower because by providing a cylinder axis range in a single contact lens, the cylinder axis increments may be increased.

The toric contact lens design of the present invention may be utilized for the correction of low levels of astigmatism as well as to be selectively utilized to enhance visual acuity for higher degrees of astigmatism. These design parameters or modifications may be implemented either on the front or back curve surfaces of the contact lens without any change in performance relative to astigmatism correction.

The toric contact lens of the present invention may be manufactured utilizing any suitable process without a significant increase in expense or complexity. This design may be implemented in any number or type of contact lenses or any other lenses, for example, intraocular lenses, corneal inlays, corneal onlays and the like.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1:
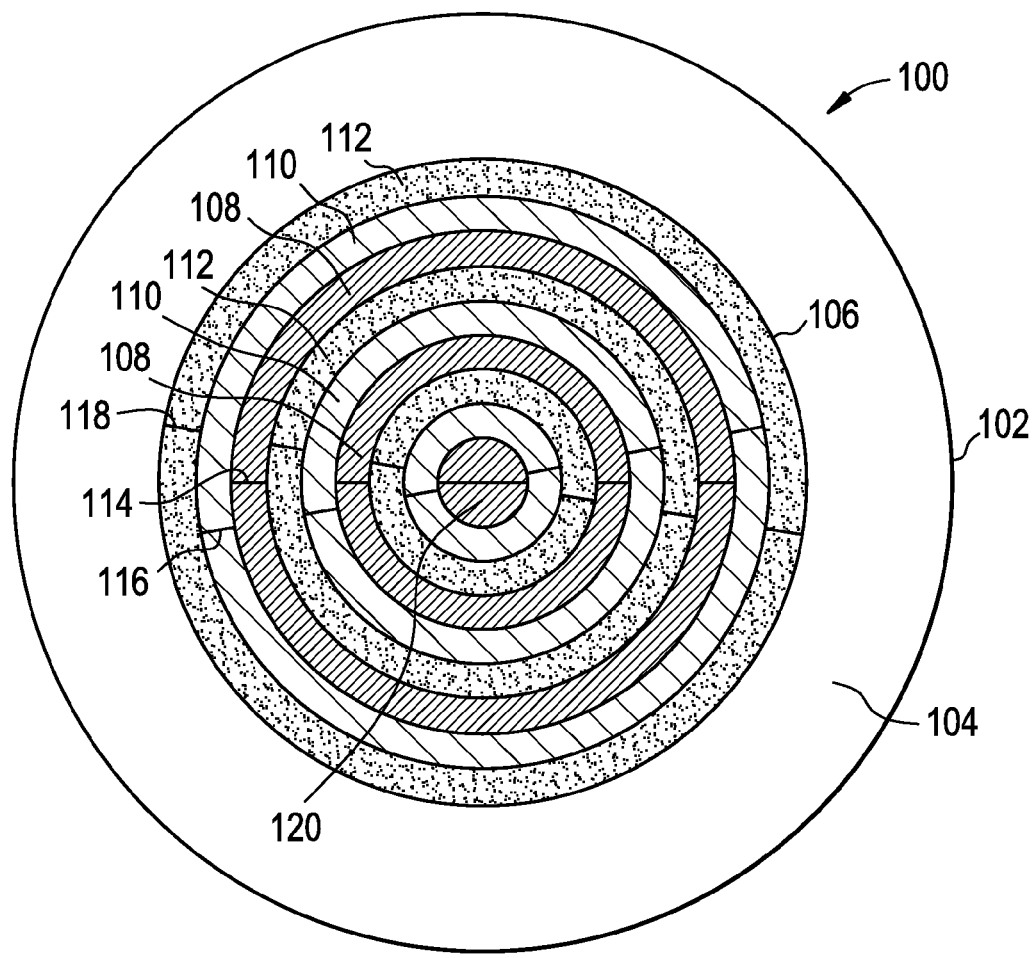
FIG. 1 is a diagrammatic representation of a first exemplary toric contact lens having a multifocus axis design in accordance with the present invention.

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. However, these new contact lenses are not totally without limitations.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer-plastic materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from silicone polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

For purposes of the present invention a contact lens is defined by at least two distinct regions. The inner region or optical zone from which the vision correction is obtained and the outer peripheral zone of the contact lens that provides mechanical stability of the contact lens on eye. In some cases, or contact lens designs an intermediate zone or region located between the inner optical zone and the outer peripheral zone may be used for blending the two aforementioned zones in a smooth manner such that discontinuities do not occur. A contact lens is also defined by a front surface or surface power, a back curve or base curve and an edge.

The inner region or optical zone provides vision correction and is designed for a specific need such as single vision myopia or hyperopia correction, astigmatism vision correction, bi-focal vision correction, multi-focal vision correction, custom correction or any other design that may provide vision correction. The outer periphery or peripheral zone provides stabilization of the contact lens on the eye including, centration and orientation. Orientation stabilization is fundamental when the optical zone includes non-rotationally symmetric features, such as astigmatic correction and/or high order aberrations correction. The intermediate region or zone ensures that the optical zone and the peripheral zone are blended with tangent curves. It is important to note that both the optical zone and the peripheral zone may be designed independently, though sometimes their designs are strongly related when particular requirements are necessary. For example, the design of a toric lens with an astigmatic optical zone might require a particular peripheral zone for maintaining the contact lens at a predetermined orientation on the eye.

Toric contact lenses have different designs than spherical contact lenses. The optical zone portion of toric contact lenses have two powers in them, spherical and cylindrical, created with curvatures generally at right angles to each other. The powers are required to maintain position at the specific angle, cylinder axis, on the eye to provide the required astigmatic vision correction. The mechanical or outer peripheral zone of toric contact lenses typically comprises a stabilization means to properly rotate and orient the cylindrical or astigmatic axis into position while being worn on the eye. Rotating the contact lens to its proper position when the contact lens moves, or when the contact lens is inserted is important in producing a toric contact lens.

Certain toric contact lens designs utilize a stabilization technology that relies on natural eyelid pressures or tension and specific thickness variations in the contact lens periphery to establish lens rotational stability on the eye. These contact lenses quickly orient on the eye after lens insertion and maintain rotational stability throughout eye movements. The contact lens interacts with the eyelids to actively balance the contact lens in place when the eye is open and quickly re-align the contact lens if it rotates out of position. However, in order to compensate for temporary off axis positioning and/or to minimize reliance solely on maintaining rotational stability, toric contact lenses may be designed with varying lens design parameters in the optic zone as discussed in detail subsequently.

The present invention is directed to a toric contact lens with a multifocus axis component built or designed into the contact lens in addition to potential mechanical stabilization features built or designed into the peripheral zone. It is important to note that any suitable mechanical stabilization zone may be utilized. Accordingly, the toric contact lens of the present invention provides astigmatic patients with a contact lens that reduces the sensitivity of the patient to toric axis misalignment, which in turn reduces the rotational stabilization requirements for a given toric contact lens design. The toric contact lens design of the present invention utilizes concentric annular rings wherein the cylinder axis will vary between adjacent annuli, a continually or continuously varying lens design parameter, cylinder axis, as a function of distance from the lens center, or any alternate design means to create a range of cylinder axis zones. With this range of cylinder axis zones, the toric contact lenses of the present invention may also reduce the number of cylinder axis placements or stock keeping units (SKUs) required to fit astigmatic patients relative to conventional toric contact lens designs. In other words, the number of SKUs required may be lower because by providing a cylinder axis range in a single lens, the cylinder axis increments may be increased. For example, rather than five or ten degree increments, twenty degree increments may be utilized. Essentially, this design may be utilized for the correction of low levels of astigmatism and also be selectively utilized to enhance visual acuity for higher amounts of astigmatism. These design parameters may be implemented either on the front or back surface or curves of the contact lens without any change in astigmatism correction.

In accordance with a first exemplary embodiment, alternating concentric rings are utilized to divide the optical zone of a contact lens into regions each having two optical powers; namely, a first optical power corresponding to the refractive spherical component of a patient's basic prescription and a second optical power corresponding to the cylindrical power of a patient's basic prescription or a portion thereof. FIG. 1 illustrates a toric contact lens 100 in accordance with this first exemplary embodiment. The exemplary toric contact lens 100 comprises a contact lens edge 102, a peripheral zone 104 comprising any suitable stabilization features as is known in the art and an optical zone 106. The optical zone 106 comprises a central disc 120 which comprises the refractive spherical and cylindrical components at the nominal cylinder axis meridian 114, and a number of alternating concentric annular rings or bands 108, 110 and 112. The number of rings or bands may vary depending on a number of factors, including the ability of the eye/brain to transition from band to band and the degree of alignment with the pupil as well as manufacturing capabilities. Each concentric annual ring 108, 110 and 112 has a different cylindrical axis and which alternate to create a nominal axis meridian 114, a lower boundary meridian 116 and an upper boundary meridian 118, or any axis meridian between the two boundary meridians, such that the toric contact lens 100 is rotationally desensitized because of the multifocal affect provided by the plurality of concentric annular rings 108, 110 and 112.

More specifically, the alternating concentric rings 108, 110 and 112 create a region within the optic zone 106 of cylinder powers along different axes. For example, if the patient's nominal cylindrical axis is forty-five (45) degrees, the lower boundary axis may be thirty (30) degrees and the upper boundary axis may be sixty (60) degrees. Accordingly, for this patient, a first particular area percentage of the optic zone 106 would have his or her nominal cylindrical power axis, a second particular area percentage of the optic zone 106 would be fifteen (15) degrees above his or her nominal cylindrical power axis, and a third particular area percentage of the optic zone would be fifteen (15) degrees below his or her nominal cylindrical power axis. The range may be between plus ninety (90) degrees and minus ninety (90) degrees, as is preferably between plus and minus five (5) degrees and plus and minus ten (10) degrees. In addition, the areas may also be varied. In other words, the percentage of the optical zone for each axis may be varied as is explained in detail subsequently.

Figure 2:
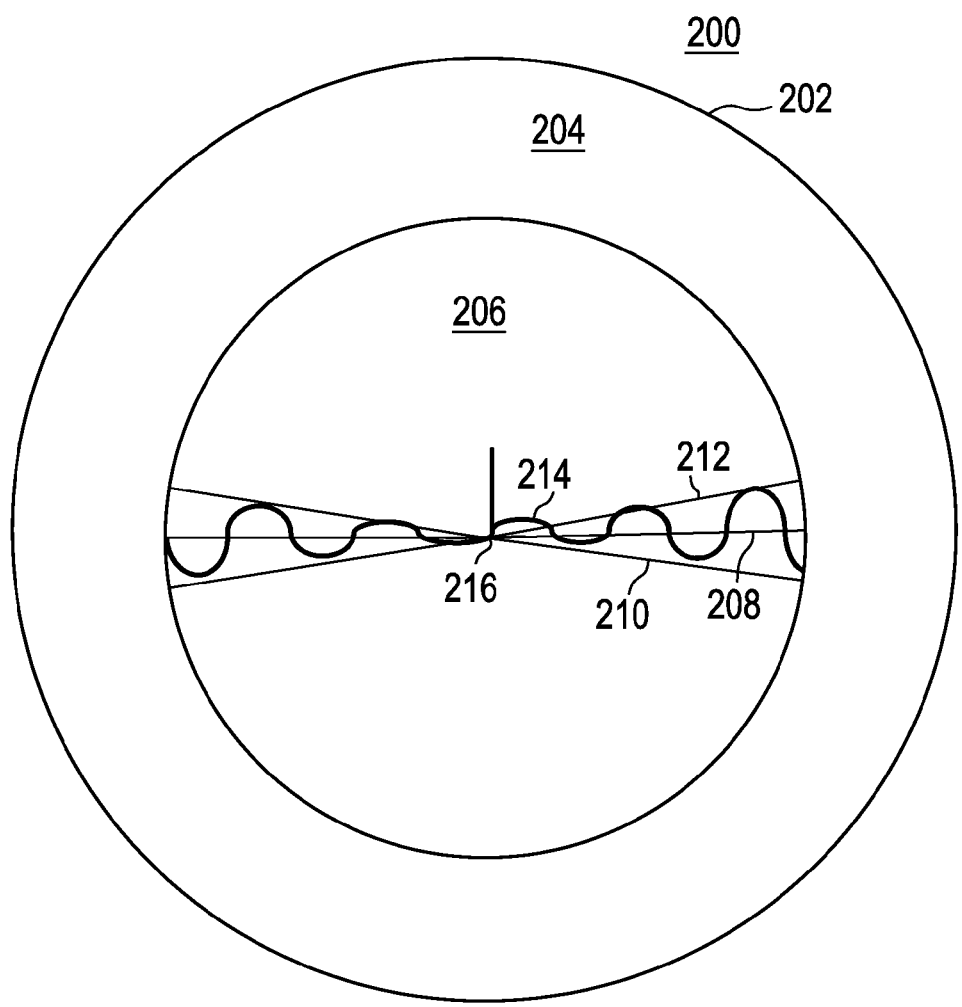
FIG. 2 is a diagrammatic representation of a second exemplary toric contact lens having a multifocus axis design in accordance with the present invention.

In accordance with another exemplary embodiment, a continuously varying toric lens axis may be realized as a function of the distance from the contact lens center, wherein at any given distance from the contact lens center, the power profile at that point will have two optical powers; namely, a first optical power corresponding to the refractive spherical component or a patent's basic prescription and a second optical power corresponding to the cylindrical power of a patient's basic prescription or a portion thereof. FIG. 2 illustrates a toric contact lens 200 in accordance with this exemplary embodiment. The exemplary toric contact lens 200 comprises a contact lens edge 202, a peripheral zone 204 comprising any suitable stabilization features as is known in the art and an optical zone 206. In this exemplary embodiment, the optical zone 206 comprises a nominal axis meridian 208, a lower boundary axis meridian 210 and an upper boundary axis meridian 212 all defined by a continuous function 214 which varies in amplitude from the contact lens center 216. The concept of creating this region is the same as in the previously described exemplary embodiment, and realized in a continuous manner rather than in a discrete manner.

The spherical and cylinder powers of this contact lens design may also vary as a function of the distance from the lens center to further enhance the depth-of-field effect for a given prescription. An aspheric surface may also be superimposed on the toric curve to enhance the depth-of-field effect of the contact lens. The lens of the present invention may be a contact lens as described herein or an intraocular lens.

In order to determine the sensitivity to cylinder axis misorientation of a toric contact lens in accordance with the present invention, a rotated zone toric analysis was performed. In this example or analysis, a fixed rotational angle, θ, was utilized with varied cylinder powers to see how the toric contact lens of the present invention performed against a standard toric contact lens. Three test cases or prescriptions were utilized in the analysis as summarized in Table 1 below.

TABLE 1

| Spherical Power −2.0 D | Cyl = −0.75 D | Axis = 0 |
| Spherical Power −2.0 D | Cyl = −1.50 D | Axis = 0 |
| Spherical Power −2.0 D | Cyl = −2.25 D | Axis = 0 |

Figure 3:
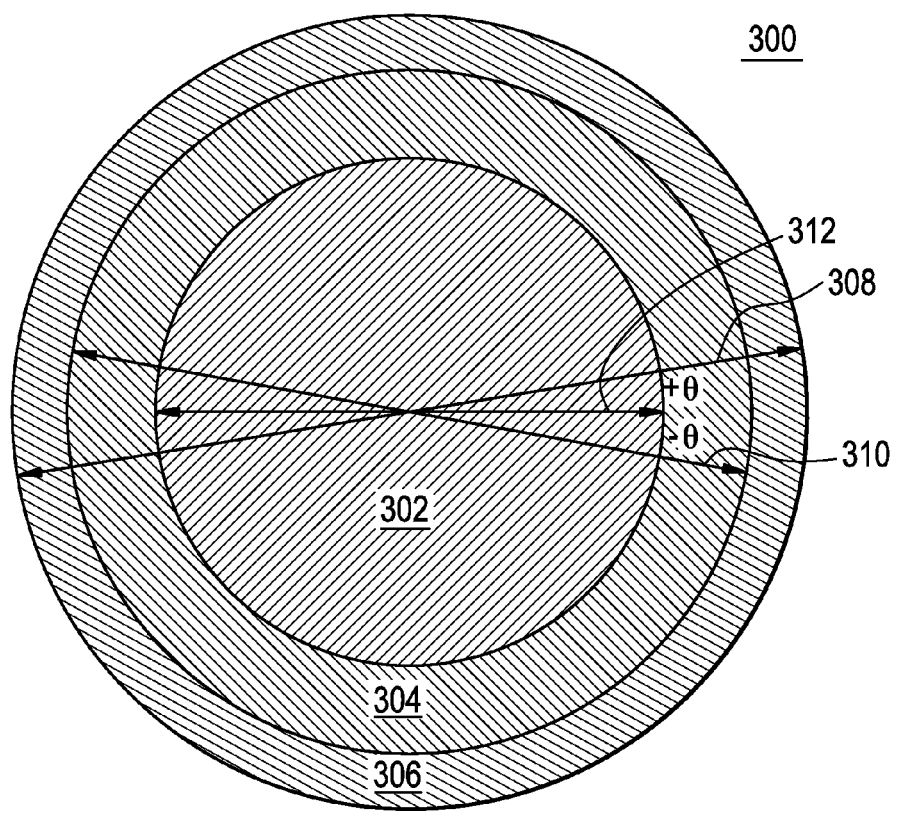
FIG. 3 is a diagrammatic representation of a third exemplary toric contact lens having a multifocus axis design in accordance with the present invention.

The analysis was performed with the contact lens rotated between zero (0) and five (5) degrees. FIG. 3 illustrates the optic zone 300 of a toric contact lens designed in accordance with the annular ring concept of the first exemplary embodiment that was utilized in performing this analysis. As illustrated, the optic zone 300 comprises a first zone 302, a second zone 304, and a third zone 306 each having their own cylindrical axis as described above and creating the upper boundary axis meridian 308, the lower boundary axis meridian 310, and the nominal axis meridian 312. The upper and lower boundary axis meridians 308 and 310 are plus θ degrees and minus θ degrees from the nominal axis meridian 312. The center or first zone 302 is about fifty (50) percent of the area of the optic zone 300, the ring around first zone 302 or the second zone 304 is about twenty-five (25) percent of the optic zone 300, and the ring around the second zone 304 or the third zone 306 is about twenty-five (25) percent of the optic zone 300. Accordingly, if the contact lens is seated properly on the eye of the patient, the patient will have about fifty (50) percent of the optic zone 300 properly aligned, whereas if the contact lens were rotated by plus θ degrees, than about twenty-five (25) percent of the optic zone 300 would be properly aligned, about twenty-five (25) percent of the optic zone 300 would be misaligned by 2θ degrees, and about fifty (50) percent of the optic zone would be misaligned by θ degrees, and if the contact lens were rotated by minus θ degrees, than about twenty-five (25) percent of the optic zone 300 would be properly aligned, about twenty-five (25) percent of the optic zone 300 would be misaligned by 2θ degrees. Also in this analysis, a five (5) mm optic zone is matched to a five (5) mm pupil. The contact lens is surface modeled in Code V using an INT surface. The results of the analysis are presented in Table 2 below.

TABLE 2

| | RMS Spot Size (mm) | Geometric Spot Size (mm) | Computed VA (−10LogMAR) | Letters lost relative to standard toric with no rotation error | Area weighted MTF 3-12 cpd | Area weighted MTF 5-20 cpd |
| --- | --- | --- | --- | --- | --- | --- |
| 1 zone, −2D, −0.75D Cyl | 0.0181 | 0.0578 | 0.0311 | | 5.9780 | 6.8984 |
| 1 zone, −2D, −0.75D Cyl, rotated 5 deg | 0.0185 | 0.0601 | −0.0353 | 0.1765 | 5.8309 | 6.4451 |
| 3 zone, 5 deg, −2D, −0.75D Cyl | 0.0243 | 0.2136 | −0.0448 | 0.2240 | 5.5949 | 6.3346 |
| 3 zone, 5 deg, −2D, −0.75D Cyl, rotated 5 deg | 0.0303 | 0.2231 | −0.1134 | 0.5672 | 5.4589 | 5.8420 |
| 1 zone, −2D, −1.50D Cyl | 0.0178 | 0.0545 | 0.0407 | | 6.0235 | 6.9829 |
| 1 zone, −2D, −1.50D Cyl, rotated 5 deg | 0.0193 | 0.0629 | −0.1659 | 0.8295 | 5.4676 | 5.3228 |
| 3 zone, 5 deg, −2D, −1.50D Cyl | 0.0374 | 0.4122 | −0.1723 | 0.8617 | 5.0734 | 5.4546 |
| 3 zone, 5 deg, −2D, −1.50D Cyl, rotated 5 deg | 0.0520 | 0.4090 | −0.3479 | 1.7394 | 4.5515 | 3.9445 |
| 1 zone, −2D, −2.25D Cyl | 0.0174 | 0.0538 | 0.0492 | | 6.0694 | 7.0627 |
| 1 zone, −2D, −2.25D Cyl, rotated 5 deg | 0.0209 | 0.0669 | −0.3066 | 1.5330 | 4.8736 | 3.8256 |
| 3 zone, 5 deg, −2D, −2.25D Cyl | 0.0525 | 0.6092 | −0.2974 | 1.4869 | 4.6717 | 4.6514 |
| 3 zone, 5 deg, −2D, −2.25D Cyl, rotated 5 deg | 0.0618 | 0.6897 | −0.5409 | 2.7047 | 3.6298 | 2.4043 |

From the results of the analysis, the computed vision performance, computed VA, of the rotated zone toric design with −0.75 D of cylinder was substantially equivalent to that of a standard toric contact lens. The computed VA performance of the rotated zone toric designs with higher cylinder powers was slightly worse, about 1 to 1.5 letters, than that of a standard toric lens contact lens whether the contact lens had a rotation error applied or not. The RMS spot size performance of the rotated zone toric designs was inferior in the range from about thirty (30) percent to about three hundred (300) percent relative to that of a standard toric lens lens for all cylinder axes evaluated whether the contact lens had a rotation error applied or not. The area weighted MTP performance evaluated over 3-12 cycles per degree of the rotated zone toric designs was inferior, about ten (10) percent or more, to that of a standard toric contact lens for all cylinder values evaluated whether the contact lens had a rotation error or not.

In order to determine the sensitivity to rotation error for a toric contact lens in accordance with the present invention, a second rotated zone toric analysis was performed. In this example or analysis the contact lens was rotated from zero (0) to thirty (30) degrees in five (5) degree increments with a fixed cylinder to see how the toric contact lens of the present invention performed against a standard toric contact lens. The toric contact lens prescription is given in Table 3 below.

TABLE 3

| Spherical Power −2.0 D | Cyl = −0.75 D | Axis = 0 |
| --- | --- | --- |

Figure 4:
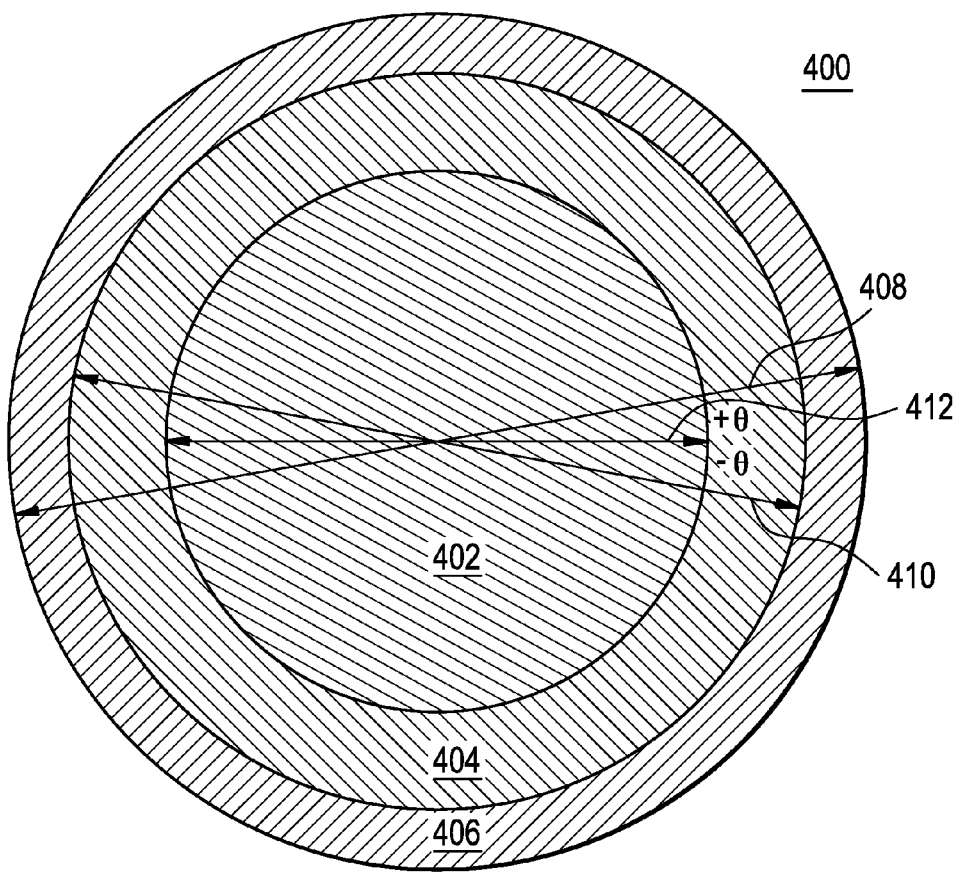
FIG. 4 is a diagrammatic representation of a fourth exemplary toric contact lens having a multifocus axis design in accordance with the present invention.

The analysis was performed with the contact lens rotated between zero (0) and thirty (30) degrees in five (5) degree increments. FIG. 4 illustrates the optic zone 400 of a toric contact lens designed in accordance with the annular ring concept of the first exemplary embodiment that was utilized in performing this analysis. As illustrated, the optic zone 400 comprises a first zone 402, a second zone 404, and a third zone 406 each having their own cylindrical axis as described above and creating the upper boundary axis meridian 408, the lower boundary axis meridian 410, and the nominal axis meridian 412. The upper and lower boundary axis meridians 408 and 410 are plus θ degrees and minus θ degrees from the nominal axis meridian 412. The center or first zone 402 is about fifty (50) percent of the area of the optic zone 400, the ring around first zone 402 or the second zone 404 is about twenty-five (25) percent of the optic zone 400, and the ring around the second zone 404 or the third zone 406 is about twenty-five (25) percent of the optic zone 400. Accordingly, if the contact lens is seated properly on the eye of the patient, the patient will have about fifty (50) percent of the optic zone 400 properly aligned, whereas if the contact lens were rotated by plus θ degrees, than about twenty-five (25) percent of the optic zone 400 would be properly aligned, about twenty-five (25) percent of the optic zone 400 would be misaligned by 2θ degrees, and about fifty (50) percent of the optic zone would be misaligned by θ degrees, and if the contact lens were rotated by minus θ degrees, than about twenty-five (25) percent of the optic zone 400 would be properly aligned, about twenty-five (25) percent of the optic zone 400 would be misaligned by 2θ degrees. Also in this analysis, a five (5) mm optic zone is matched to a five (5) mm pupil. The contact lens is surface modeled in Code V using an INT surface. The results of the analysis are presented in Table 4 below.

TABLE 4

| | RMS Spot Size (mm) | Geometric Spot Size (mm) | Computed VA (−10LogMAR) | Letters lost relative to standard toric with no rotation error | Area weighted MTF 3-12 cpd | Area weighted MTF 5-20 cpd |
|---|---|---|---|---|---|---|
| 1 zone, −2D, −0.75D Cyl | 0.0181 | 0.0578 | 0.0311 | | 5.9780 | 6.8984 |
| 1 zone, −2D, −0.75D Cyl, rotated 5 deg | 0.0185 | 0.0601 | −0.0353 | 0.4656 | 5.8309 | 6.4451 |
| 3 zone, 5 deg, −2D, −0.75D Cyl | 0.0243 | 0.2136 | −0.0448 | 0.5131 | 5.5949 | 6.3346 |
| 3 zone, 5 deg, −2D, −0.75D Cyl, rotated 5 deg | 0.0303 | 0.2231 | −0.1134 | 0.8563 | 5.4589 | 5.8420 |
| 1 zone, −2D, −0.75D Cyl | 0.0181 | 0.0578 | 0.0311 | | 5.9780 | 6.8984 |
| 1 zone, −2D, −0.75D Cyl, rotated 10 deg | 0.0196 | 0.0639 | −0.1717 | 1.1476 | 5.4283 | 5.2924 |
| 3 zone, 10 deg, −2D, −0.75D Cyl | 0.0374 | 0.4175 | −0.1794 | 1.1863 | 5.0437 | 5.4094 |
| 3 zone, 10 deg, −2D, −0.75D Cyl, rotated 10 deg | 0.0451 | 0.4458 | −0.3434 | 2.0064 | 4.5726 | 3.9979 |
| 1 zone, −2D, −0.75D Cyl | 0.0181 | 0.0578 | 0.0311 | | 5.9780 | 6.8984 |
| 1 zone, −2D, −0.75D Cyl, rotated 15 deg | 0.0214 | 0.0685 | −0.3083 | 1.8306 | 4.8548 | 3.8927 |
| 3 zone, 15 deg, −2D, −0.75D Cyl | 0.0557 | 0.6202 | −0.3043 | 1.8108 | 4.6354 | 4.6099 |
| 3 zone, 15 deg, −2D, −0.75D Cyl, rotated 15 deg | 0.0638 | 0.6475 | −0.5170 | 2.8741 | 3.7666 | 2.6081 |
| 1 zone, −2D, −0.75D Cyl | 0.0181 | 0.0578 | 0.0311 | | 5.9780 | 6.8984 |
| 1 zone, −2D, −0.75D Cyl, rotated 20 deg | 0.0236 | 0.0738 | −0.4429 | 2.5036 | 4.2053 | 2.6459 |
| 3 zone, 20 deg, −2D, −0.75D Cyl | 0.0713 | 0.8207 | −0.3922 | 2.2501 | 4.4007 | 4.1078 |
| 3 zone, 20 deg, −2D, −0.75D Cyl, rotated 20 deg | 0.0754 | 0.8800 | −0.6528 | 3.5531 | 3.1389 | 1.9120 |
| 1 zone, −2D, −0.75D Cyl | 0.0181 | 0.0578 | 0.0311 | | 5.9780 | 6.8984 |
| 1 zone, −2D, −0.75D Cyl, rotated 25 deg | 0.0261 | 0.0793 | −0.5762 | 3.1701 | 3.5661 | 1.7307 |
| 3 zone, 25 deg, −2D, −0.75D Cyl | 0.0813 | 0.9554 | −0.4462 | 2.5201 | 4.2734 | 3.8444 |
| 3 zone, 25 deg, −2D, −0.75D Cyl, rotated 25 deg | 0.0951 | 1.0554 | −0.7618 | 4.0981 | 2.7077 | 1.6722 |
| 1 zone, −2D, −0.75D Cyl | 0.0181 | 0.0578 | 0.0311 | | 5.9780 | 6.8984 |
| 1 zone, −2D, −0.75D Cyl, rotated 30 deg | 0.0288 | 0.0851 | −0.7012 | 3.7951 | 2.9996 | 1.1382 |
| 3 zone, 30 deg, −2D, −0.75D Cyl | 0.0998 | 1.2649 | −0.4895 | 2.7365 | 4.1369 | 3.6165 |
| 3 zone, 30 deg, −2D, −0.75D Cyl, rotated 30deg | 0.1098 | 1.2214 | −0.8439 | 4.5086 | 2.4434 | 1.6323 |

From the results of the analysis, the computed vision performance, computed VA, of the rotated toric design rotated five (5) degrees was equivalent to that of a standard toric contact lens, less than 0.5 letters different. The computed VA performance of the rotated zone toric designs with rotation values of ten (10) degrees or greater was slightly worse, about 1 to 2.75 letters, than that of a standard toric contact lens with the same rotation angle. The RMS spot size performance of the rotated zone toric designs was inferior in the range between about thirty (30) percent and three hundred (300) relative to that of a standard toric contact lens for all angular rotation values. The area weighted MTF performance evaluated over 3-12 cycles per degree of the rotated zone toric designs was inferior, about ten (10) percent or more, to that of a standard toric contact lens for all rotation values greater than five (5) degrees. The MTF performance correlates very closely to the computed VA performance.

Although the computed VA is lower than that for a conventional toric contact lens, the change in computed VA due to the contact lens rotating on the eye (vision fluctuation) may be less for the rotated zone toric contact lens designs. This may be seen at high cylinder levels, see Table 2, and for higher rotation angle levels, see Table 4.

The rotated zone toric lens designs of the present invention may be utilized in combination with mechanical stabilization features to provide enhanced toric lens design performance. These designs may be more difficult to manufacture and test than standard toric lenses due to the discontinuous surfaces that arise at the zone boundaries.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic device comprising:
   a contact lens requiring rotational stability on an eye, the contact lens having a front curve surface, a back curve surface, an optical zone and a peripheral stabilization zone configured to minimize on eye rotation; and
   a multifocus axis component incorporated into at least one of the front curve surface or the back curve surface of the contact lens in the optical zone and having a central disc which includes refractive spherical and cylindrical components at a nominal cylinder axis and a number of alternating concentric annular bands, wherein each band has a different cylindrical axis and which alternate to create a nominal axis meridian, a lower boundary meridian and an upper boundary meridian, wherein the range from the lower boundary meridian to the upper boundary meridian is between +/−5 degrees to +/−10 degrees.

2. An ophthalmic device comprising:
   a contact lens requiring rotational stability on an eye, the contact lens having a front curve surface, a back curve surface, an optical zone and a peripheral stabilization zone configured to minimize on eye rotation; and
   a multifocus axis component incorporated into a least one of the front curve surface or the back curve surface of the contact lens in the optical zone and comprising a nominal axis meridian, a lower boundary axis meridian and an upper boundary axis meridian each defined by a continuous function which varies in amplitude from the contact lens center wherein the range from the lower boundary meridian to the upper boundary meridian is between +/−5 degrees to +/−10 degrees.

* * * * *